(12) United States Patent
Chou et al.

(10) Patent No.: US 7,463,375 B2
(45) Date of Patent: Dec. 9, 2008

(54) COPIER ENCODING GRAY-LEVEL IMAGE DATA INTO FORMAT FOR STORAGE AND DECODING TO PRINT REMAINING COPIES IF MEMORY HAS LARGE ENOUGH STORAGE CAPACITY

(75) Inventors: Mei-Tai Chou, Taipei (TW); Wei-Che Shen, Taipei (TW); Yu-Ju Tung, Taipei Hsien (TW)

(73) Assignee: Qisda Corporation, Tayuan County (TW)

( * ) Notice: Subject to any disclaimer, the term of this patent is extended or adjusted under 35 U.S.C. 154(b) by 480 days.

(21) Appl. No.: 11/164,026

(22) Filed: Nov. 8, 2005

(65) Prior Publication Data

US 2006/0098218 A1 May 11, 2006

(30) Foreign Application Priority Data

Nov. 8, 2004 (TW) .................. 93134020 A (51) Int. Cl.
*H04N 1/21* (2006.01)
*H04N 1/41* (2006.01)

(52) U.S. Cl. .................. 358/1.14; 358/1.16; 358/404; 358/426.05

(58) Field of Classification Search ............... 358/1.14, 358/1.16, 1.17, 524, 403, 404, 444, 426.04, 358/426.05, 426.06; 382/232, 244–250, 382/305

See application file for complete search history.

(56) References Cited

U.S. PATENT DOCUMENTS

| | | | | |
|---|---|---|---|---|
| 5,604,846 A | * | 2/1997 | Kadota | 358/1.16 |
| 6,038,033 A | * | 3/2000 | Bender et al. | 358/1.16 |
| 6,092,171 A | * | 7/2000 | Relph | 358/1.16 |
| 6,496,278 B1 | * | 12/2002 | Tamura et al. | 358/1.16 |
| 6,519,052 B1 | * | 2/2003 | Oneda et al. | 358/1.16 |
| 6,796,730 B2 | * | 9/2004 | Toda et al. | 358/1.16 |
| 6,809,832 B2 | * | 10/2004 | Kubota | 358/1.16 |
| 6,833,929 B2 | * | 12/2004 | Tamura | 358/1.16 |
| 2006/0103889 A1 | * | 5/2006 | Adachi et al. | 358/426.04 |

* cited by examiner

*Primary Examiner*—Scott A Rogers (57) ABSTRACT

A copier transforms an original image into M copies in N formats. The copier has an image capturing module, an image processing module, an error diffusion module, a render & control module, an image output device, an image compressor, a memory, a data de-compressor, and a processor for controlling the image capturing module, the image processing module, the error diffusion module and the image outputting device, and for controlling the image compressor, the memory and the data de-compressor by determining M, N, and the size of a compressed image from the original image by the image compressor.

12 Claims, 12 Drawing Sheets

COPIER ENCODING GRAY-LEVEL IMAGE DATA INTO FORMAT FOR STORAGE AND DECODING TO PRINT REMAINING COPIES IF MEMORY HAS LARGE ENOUGH STORAGE CAPACITY

BACKGROUND OF THE INVENTION

1. Field of the Invention

The present invention relates to a copier, and more particularly, to a copier capable of switching printing processes according to control data.

2. Description of the Prior Art

Figure 1:
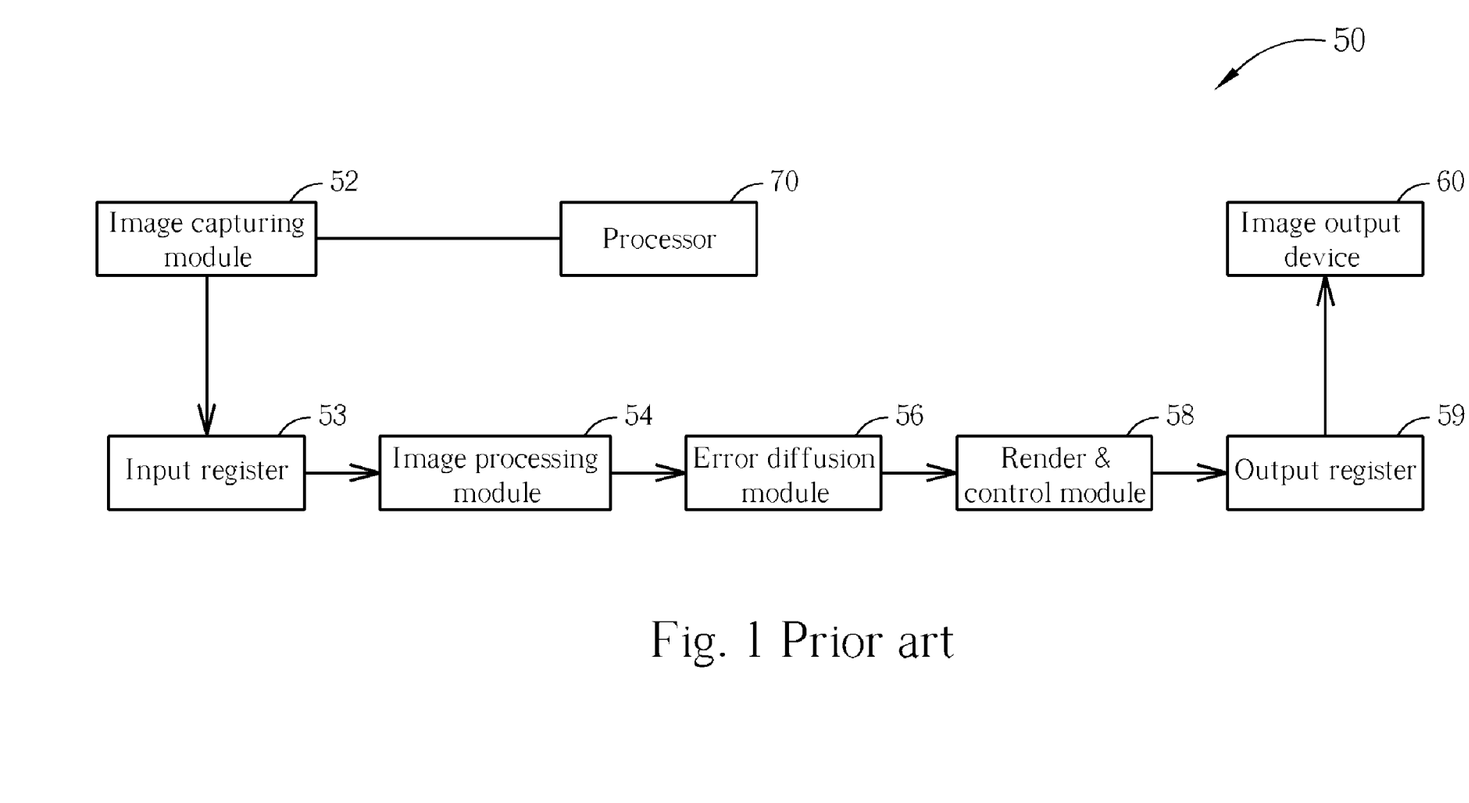
FIG. 1 is a function block diagram of a copier according to the prior art.

Please refer to FIG. 1, which is a function block diagram of a copier 50 according to the prior art. The copier 50 comprises an image capturing module 52, an input register 53 electrically connected to the image capturing module 52, an image processing module 54 electrically connected to the input register 53, an error diffusion module 56 electrically connected to the image processing module 54, a render & control module 58 electrically connected to the error diffusion module 56, an output register 59 electrically connected to the render & control module 58, an image output device 60 electrically connected to the output register 59, and a processor 70 electrically connected to the image capturing module 52, the image processing module 54, the error diffusion module 56, the render & control module 58, and the image output device 60 for controlling the operations of the image capturing module 52, the image processing module 54, the error diffusion module 56, the render & control module 58, and the image output device 60.

The operation of the copier 50 is described as follows: The image capturing module 52 captures an original image, and transforms the original image into a gray-leveled image, which will be stored into the input register 53; The image processing module 54 executes a plurality of image processes, such as a luminance & chrominance adjusting process, on the gray-leveled image stored in the input register 53, and transfers the processed gray-leveled image to the error diffusion module 56; The error diffusion module 56 transforms the processed gray-leveled image from the image processing module 54 into a half-toned image, and reallocates or divides the half-toned image; The render & control module 58 transforms the reallocated half-toned image into a printable image, and transfers the printable image via the output register 59 to the image output device 60 for printing. The gray-leveled image is the largest one in an image group consisting of the gray-leveled image, the half-toned image, and the printable image, the half-toned the second, and the printable image the smallest.

Every time when printing a copy of the original image, the copier 50 has to control the image capturing module 52 to re-capture the original image and to transform the original image into the gray-leveled image, no matter how big the quantity of the copy is. Since time for the copier 50 to capture and process the original image is much longer than that to print the printable image, the copier 50 lacks for efficiency.

SUMMARY OF THE INVENTION

It is therefore a primary objective of the claimed invention to provide a copier capable of transforming an original image into M copies in N formats, so as to overcome the drawback of the prior art.

According to the claimed invention, the copier is designed to transform an original image into M copies in N formats, where M and N are both integers, and the copier includes an image capturing module for capturing the original image and for transforming the original image into a gray-leveled image, an image processing module electrically connected to the image capturing module for processing the gray-leveled image, an error diffusion module electrically connected to the image processing module for transforming the processed gray-leveled image processed by the image processing module into a half-toned image, a render & control module electrically connected to the error diffusion module for transforming the half-toned image from the error diffusion module into a printable image, an image output device electrically connected to the render & control module for outputting the printable image output from the render & control module, an image compressor for compressing a gray-leveled image into a JPEG-formatted data, a half-toned image into a JBIG-formatted data, and a printable image into a RunLength-formatted data, a memory for storing the JPEG-, the JBIG-, and the RunLength-formatted data from the image compressor, a data de-compressor for de-compressing a JPEG-formatted data into a gray-leveled image, a JBIG-formatted data into a half-toned image, and a RunLength-formatted data into a printable image, and a processor electrically connected to the image capturing module, the image processing module, the error diffusion module, the render & control module, the image output device, the image compressor, the memory, and the data de-compressor for controlling the operations of the image capturing module, the image processing module, the error diffusion module, the render & control module, the image output device, the image compressor, the memory, and the data de-compressor.

The advantage of the claimed invention is that the copier can capture the original image once and print all of the copies in any formatted data if the remaining data storage capacity of the memory is large enough to store the JPEG-, the JBIG-, or the RunLength-formatted data, so the copier has a good efficiency. Moreover, the copier is implemented by appending an image compressor and a data de-compressor to the prior art copier, and has a simple structure.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
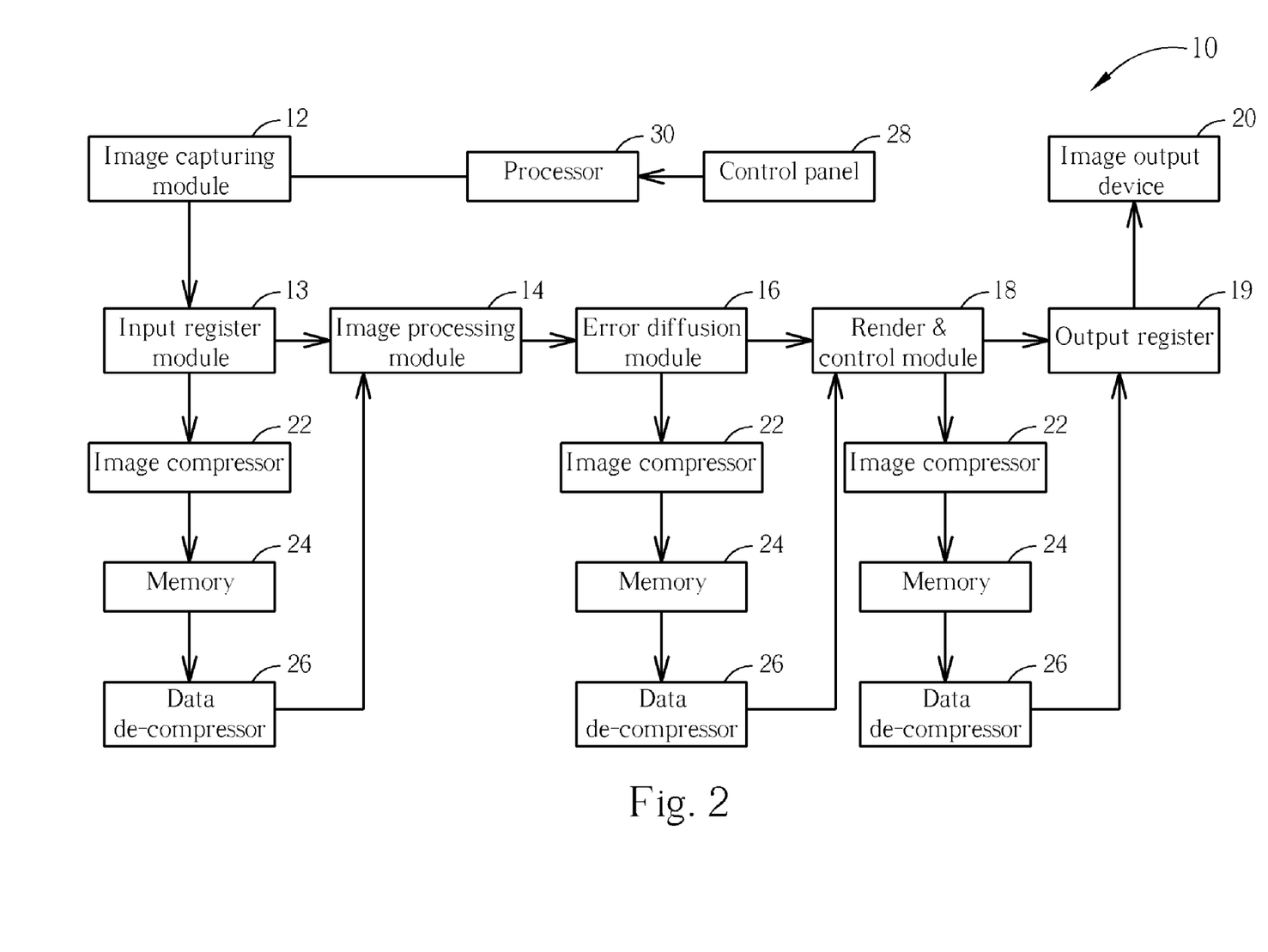
FIG. 2 is a function block diagram of a copier of the preferred embodiment according to the present invention.

Please refer to FIG. 2, which is a function block diagram of a copier 10 of the preferred embodiment according to the present invention. The copier 10 is designed to transform an original image into M copies in N formats. The copier 10 comprises an image capturing module 12 for capturing the original image and for transforming the original image into a gray-leveled image, an input register 13 electrically connected to the image capturing module 12 for storing the gray-leveled image, an image processing module 14 electrically connected to the input register 13 for executing a plurality of image processes on the gray-leveled image, an error diffusion module 16 electrically connected to the image processing module 14 for transforming the gray-leveled image from the image processing module 14 into a half-toned image, a render & control module 18 electrically connected to the error diffusion module 16 for transforming the half-toned image into a printable image, an output register 19 electrically connected to the render & control module 18 for storing the printable image, an image output device 20 electrically connected to the image output register 19 for outputting the printable image, an image compressor 22 for compressing a gray-leveled image into a JPEG-formatted data, a half-toned image into a JBIG-formatted data, and a printable image into a RunLength-formatted data, a memory 24 for storing the JPEG-, the JBIG-, and the RunLength-formatted data from the image compressor 22, a data de-compressor 26 for de-compressing a JPEG-formatted data into a gray-leveled image, a JBIG-formatted data into a half-toned image, and a RunLength-formatted data into a printable image, and for transferring the gray-leveled image to the image processing module 14, the half-toned image to the render & control module 16, and the printable image to the output register 19, a control panel 28 for inputting control data such as M and N, and a processor 30 electrically connected to the image capturing module 12, the image processing module 14, the error diffusion module 16, the render & control module 18, the image output device 20, the image compressor 22, the memory 24, the data de-compressor 26, and the control panel 28 for controlling the operations of the image capturing module 12, the image processing module 14, the error diffusion module 16, the render & control module 18, and the image output device 20, and for controlling the operations of the image compressor 22, the memory 24, and the data de-compressor 26 according to the control data input to the control panel 28, the sizes of the JPEG-formatted data, the JBIG-formatted data, and the RunLength-formatted data.

Of the copier 10 of the preferred embodiment, the image capturing module 12 is a scanner or a card reader, the image output device 20 is a printer, and the control panel 28 is a touch LCD or an LED panel with a plurality of control keys.

The processor 30 controls the gray-leveled image from the image capturing module 12 and stored in the input register 13 to flow to a variety of paths according to the control data input to the control panel 28 and the remaining data storage capacity of the memory 24. The variety of paths includes:

1. A direct output path—the processor 30 controls the gray-leveled image stored in the input register 13 to flow through the image processing module 14, the error diffusion module 16, the render & control module 18, and the output register 19 to the image output device 20;

2. A JPEG encoding path—the processor 30 controls the gray-leveled image stored in the input register 13 to flow to the image compressor 22, and controls the image compressor 22 to compress the gray-leveled image into a JPEG-formatted data and to store the JPEG-formatted data into the memory 24;

3. A JBIG encoding path—the processor 30 controls the gray-leveled image stored in the input register 13 to flow through the image processing module 14 and the error diffusion module 16 to the image compressor 22, and controls the image compressor 22 to compress a half-toned image transformed from the gray-leveled image by the error diffusion module 16 into a JBIG-formatted data and to store the JBIG-formatted data into the memory 24;

4. A RunLength encoding path—the processor 30 controls the gray-leveled image stored in the input register 13 to flow through the image processing module 14, the error diffusion module 16, and the render & control module 18 to the image compressor 22, and controls the image compressor 22 to compress a printable image transformed from a half-toned image by the render & control module 18, the half-toned image being transformed from the gray-leveled image by the error diffusion module 16, into a RunLength-formatted data and to store the RunLength-formatted data into the memory 24;

5. A JPEG decoding path—the processor 30 controls the data de-compressor 26 to decompress the JPEG-formatted data stored in the memory 24 into a gray-leveled image, and controls the gray-leveled image to flow through the image processing module 14, the error diffusion module 16, the render & control module 18, and the output register 19 to the image output device 20;

6. A JBIG decoding path—the processor 30 controls the data de-compressor 26 to decompress the JBIG-formatted data stored in the memory 24 into a half-toned image, and controls the half-toned image to flow through the render & control module 18 and the output register 19 to the image output device 20; and 7. A RunLength decoding path—the processor 30 controls the data de-compressor 26 to decompress the RunLength-formatted data stored in the memory 24 into a printable image, and controls the printable image to flow through the output register 19 to the image output device 20.

Figure 3:
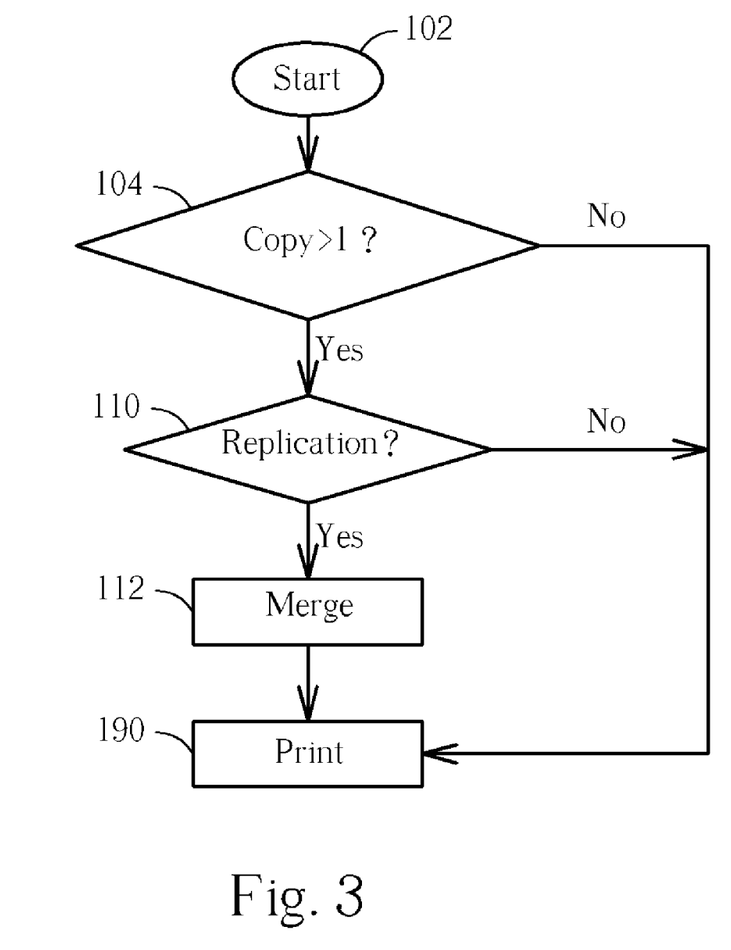
FIG. 3 is a flow chart of a method, with the copier shown in FIG. 2, to transform an original image into M copies in N formats of the preferred embodiment according to the present invention.

The processor 30 of the copier 10 controls the gray-leveled image output from the image capturing module 12 and stored in the input register 13 to flow to one of the seven paths described above according to the control data input to the control panel 28 and the remaining data storage capacity of the memory 24. Please refer to FIG. 3, which is a flow chart of a method 100, with the copier 10, to transform the original image into M copies in N formats of the preferred embodiment according to the present invention. The method 100 compresses the following steps:

Step 102: Start;

(At this moment, a printing medium, with the original image printed on, is placed on a transparent platform (not shown) of the copier 10, and a user has already input control data corresponding to the original image to the control panel 28, the control data including the information of formats and how many formats (N) of the copies, and the details corresponding to each of the formats, such as chrominance adjustment, luminance adjustment, allocation, division, and the quantity (M) of the copies. In the preferred embodiment, the formats in the control data include a printing image, a half-toned image, and a gray-leveled image, the details corresponding to the half-toned image is the allocation and division of a half-toned image, and the details corresponding to the gray-leveled image is the luminance adjustment and the chrominance adjustment of a gray-leveled image.)

Step 104: Is the quantity of the copies larger than one? If yes, go to step 110, else go to step 190;

(For example, the control data include four copy formats: The first one is "five color normal prints", the second one is "seven black-and-white manuscript prints", the third one is "two color normal prints", and the fourth one is "one color photo print".)

Step 110: Is there any replication in the details? If yes, go to step 112, else go to step 190;

(The first copy format is the same as the third copy format "color normal print".)

Step 112: Merge the replication in the copy formats; and (The processor 30 adjusts the control data to include only three copy formats: The new first one is "seven color normal prints—merging the old first one "five color normal prints" with the old third one "two color normal prints", the new second one is "seven black-and-white manuscript prints", and the new third one is "one color photo print".)

Step 190: Start to print.

(The copier 10 is about to print.)

After merging the replication in the copy formats, the method 100 controls the copier 10 to print according to the adjusted control data—step 190.

Figure 4:
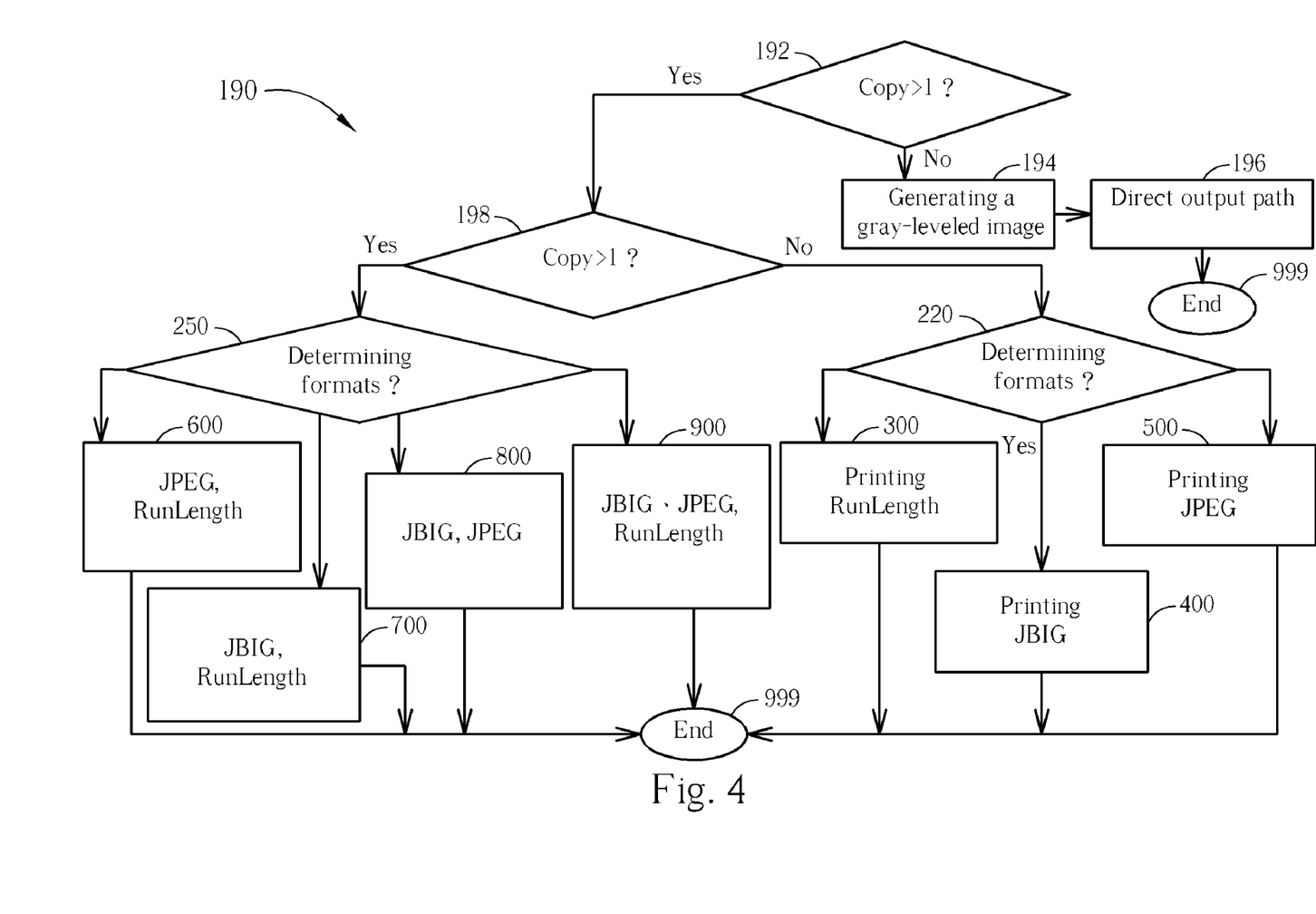
FIG. 4 is a flow chart of a first step of the method shown in FIG. 3.

Please refer to FIG. 4, which is a flow chart of the step 190 of the method 100 shown in FIG. 3. The step 190 comprises the following steps:

Step 190: Is the quantity of the copies larger than one? If yes, go to step 198, else go to step 194.

Step 194: Capture the original image, and transform the original image into a gray-leveled image;

(The processor 30 controls the image capturing module 12 to capture the original image, and the image capturing module 12 transforms the original image into a gray-leveled image, and stores the gray-leveled image into the input register 13.)

Step 196: Guide the gray-leveled image to flow into the direct output path. Go to step 999;

(Since there is only one copy, the copier 10 controls the gray-leveled image to flow through the image processing module 14, the error diffusion module 16, the render & control module 18, and the output register 19 to the image output device 20, without any compressing, storing, or de-compressing processes.)

Step 198: Is the quantity of the copy formats more than one? If yes, go to step 250, else go to step 220;

(The copier 10 is about to print.)

Step 220: Determine the copy format. If the copy format is the RunLength-formatted data, go to step 300, if the copy format is the JBIG-formatted data, go to step 400, else go to step 500;

(The method 100 determines that the copier 10 has to transform the original image into a plurality of copies, which are all in one identical copy format in a copy format group consisting of the gray-leveled image, the half-toned image, and the printable image.)

Step 250: Determine what the copy formats include. If the copy formats include the JPEG- and RunLength-formatted data, go to step 600, if the copy formats include the JBIG- and RunLength-formatted data, go to step 700, if the copy formats include the JBIG- and JPEG-formatted data, go to step 800, else go to step 900;

(The method 100 determines that the copier 10 has to transform the original image into a plurality of copies, which are either in two copy formats or in three copy formats in the copy format group.)

Step 300: Transform the original image into a plurality of copies in the RunLength-formatted data. Go to step 999;

Step 400: Transform the original image into a plurality of copies in the JBIG-formatted data. Go to step 999;

Step 500: Transform the original image into a plurality of copies in the JPEG-formatted data. Go to step 999;

Step 600: Transform the original image into a plurality of copies in the RunLength- and the JPEG-formatted data. Go to step 999;

Step 700: Transform the original image into a plurality of copies in the RunLength- and the JBIG-formatted data. Go to step 999;

Step 800: Transform the original image into a plurality of copies in the JBIG- and the JPEG-formatted data. Go to step 999;

Step 900: Transform the original image into a plurality of copies in the RunLength-, the JBIG- and the JPEG-formatted data. Go to step 999;

Step 999: End.

Coming this far, the method 100 has already determined the quantity of copies and the copy formats of the control data of the original image. The steps 300 to 900 are described one by one as follows.

Figure 5:
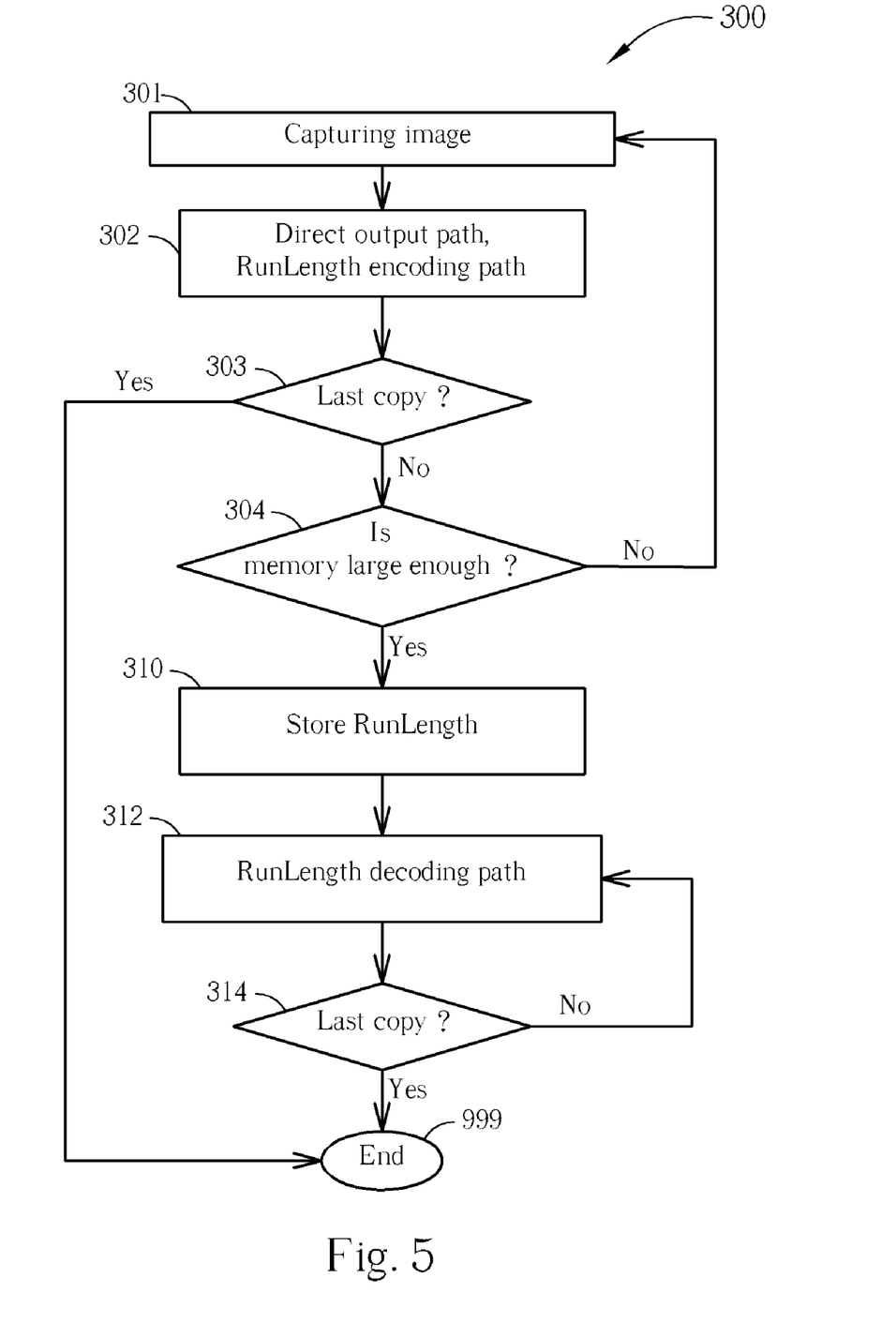
FIG. 5 is a flow chart of a second step of the method shown in FIG. 3.

Please refer to FIG. 5, which is a flow chart of the step 300 of the method 100. The step 300 comprises the following steps:

Step 301: Capture the original image and transform the original image into a gray-leveled image;

(The processor 30 controls the image capturing module 12 to capture the original image, and the image capturing module 12 transforms the original image into a gray-leveled image and stores the gray-leveled image into the input register 13.)

Step 302: Guide the gray-leveled image to flow into the direct output path and the RunLength encoding path;

(The method 100 determines that the copier 10 has to transform the original image into a plurality of copies all in the RunLength-formatted data. After controlling the image capturing module 12 to capture the original image, which will be transformed into a gray-leveled image and stored into the input register 13, the copier 10 then controls the gray-leveled image stored in the input register 13 to flow through the image processing module 14, the error diffusion module 16 to be transformed into a half-toned image, and the render & control module 18 to be transformed into a printable image to the image output device 20 to print one copy corresponding to the original image, and to the image compressor 22 to form a RunLength-formatted data. The image processing module 14 adjusts the gray-leveled image according to the details, such as the chrominance and luminance adjustment, of the control data, and the error diffusion module 16 adjusts the half-toned image according to the allocation and division details of the control data.)

Step 303: Is the copy just output from the image output device 20 the last copy? If yes, go to step 999, else go to step 304;

Step 304: Is the remaining data storage capacity of the memory 24 large enough to store the RunLength-formatted data? If yes, go to step 310, else go to step 301;

(The copier 10 is about to print.)

Step 310: Store the RunLength-formatted data into the memory 24.

(The method 100 has determined that the remaining data storage capacity of the memory 24 is large enough to store such a big RunLength-formatted data, and the processor 30 stores the Runlength-formatted data into the memory 24.)

Step 312: Guide the RunLength-formatted data stored in the memory 24 to flow into the RunLength decoding path; and (Therefore, the remaining copies can be obtained through the flow of the RunLength-formatted data stored in the memory 24 into the RunLength decoding path. Without recapturing the original image, the copier 10 has a better efficiency.)

Step 314: Is the copy just output from the image output device 20 the last copy? If yes, go to step 999, else go to step 312.

(The processor 30 does not stop guiding the RunLength-formatted data stored in the memory 24 into the RunLength decoding path until the quantity of the copies output from the image output device 20 is equal to the quantity of copies of the control data.)

Figure 6:
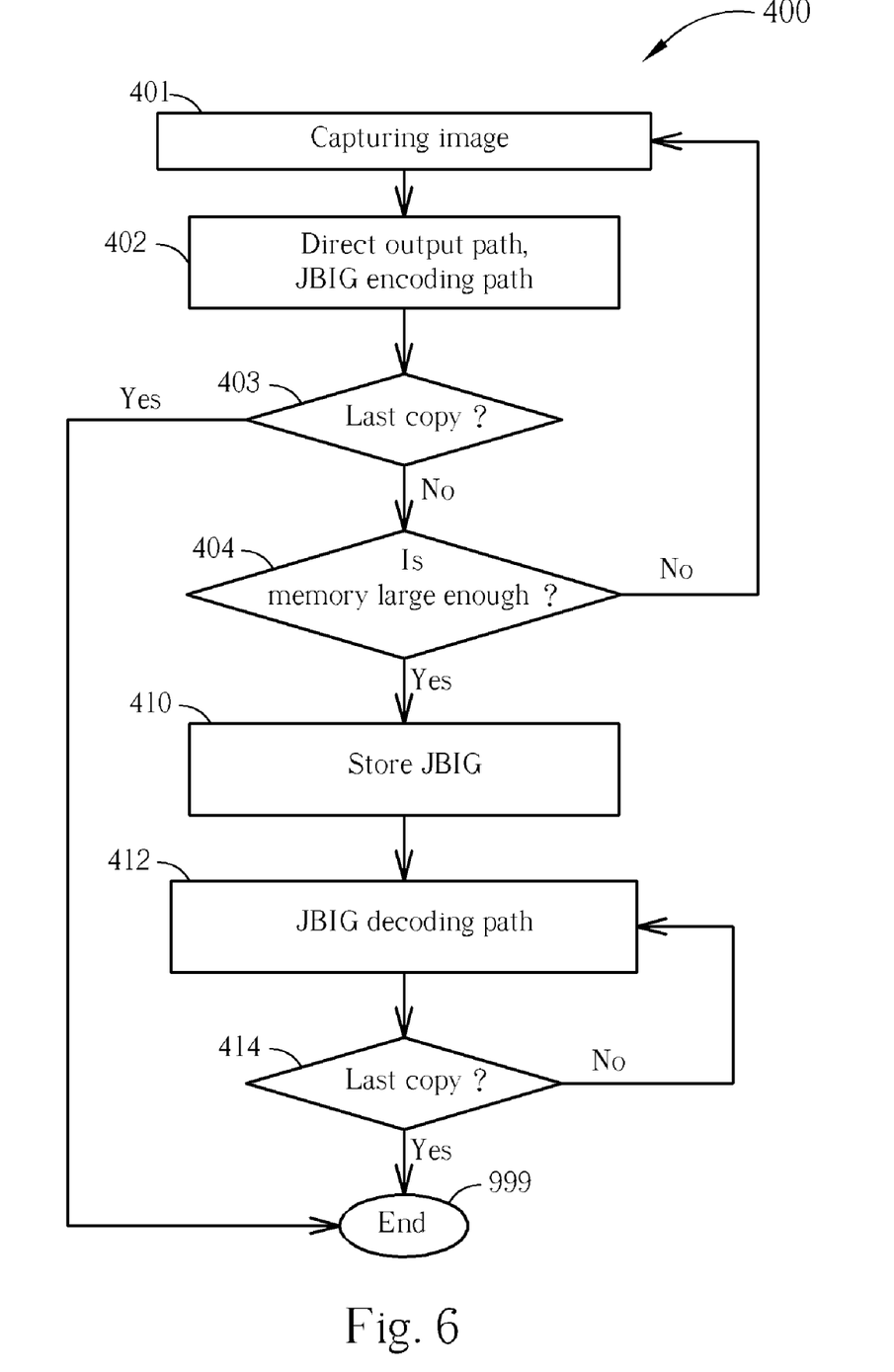
FIG. 6 is a flow chart of a third step of the method shown in FIG. 3.

Please refer to FIG. 6, which is a flow chart of the step 400 of the method 100. The step 400 comprises the following steps:

Step 401: Capture the original image and transform the original image into a gray-leveled image;

Step 402: Guide the gray-leveled image to flow into the direct output path and the JBIG encoding path;

(The method 100 determines that the copier 10 has to transform the original image into a plurality of copies all in the JBIG-formatted data. After controlling the image capturing module 12 to capture the original image, which will be transformed into a gray-leveled image and stored into the input register 13, the copier 10 then controls the gray-leveled image stored in the input register 13 to flow through the image processing module 14, the error diffusion module 16 to be transformed into a half-toned image, and the render & control module 18 to be transformed into a printable image to the image output device 20 to print one copy corresponding to the original image, and to the image compressor 22 to form a JBIG-formatted data.)

Step 403: Is the copy just output from the image output device 20 the last copy? If yes, go to step 999, else go to step 404;

Step 404: Is the remaining data storage capacity of the memory 24 large enough to store the JBIG-formatted data? If yes, go to step 410, else go to step 401;

Step 410: Store the JBIG-formatted data into the memory 24;

(The method 100 determines that the remaining data storage capacity of the memory 24 is large enough to store the JBIG-formatted data, and the processor 30 stores the JBIG-formatted data into the memory 24.)

Step 412: Guide the JBIG-formatted data stored in the memory 24 into the JBIG decoding path; and (Similarly, the remaining copies can be obtained through the flow of the JBIG-formatted data stored in the memory 24 into the JBIG decoding path. Without re-capturing the original image, the copier 10 has a better efficiency.)

Step 414: Is the quantity of the copies output from the image output device 20 equal to that of the copies of the control data? If yes, go to step 999, else go to step 412.

(The processor 30 does not stop guiding the JBIG-formatted data stored in the memory 24 into the JBIG decoding path until the quantity of the copies output from the image output device 20 is equal to the quantity of copies of the control data.)

Figure 7:
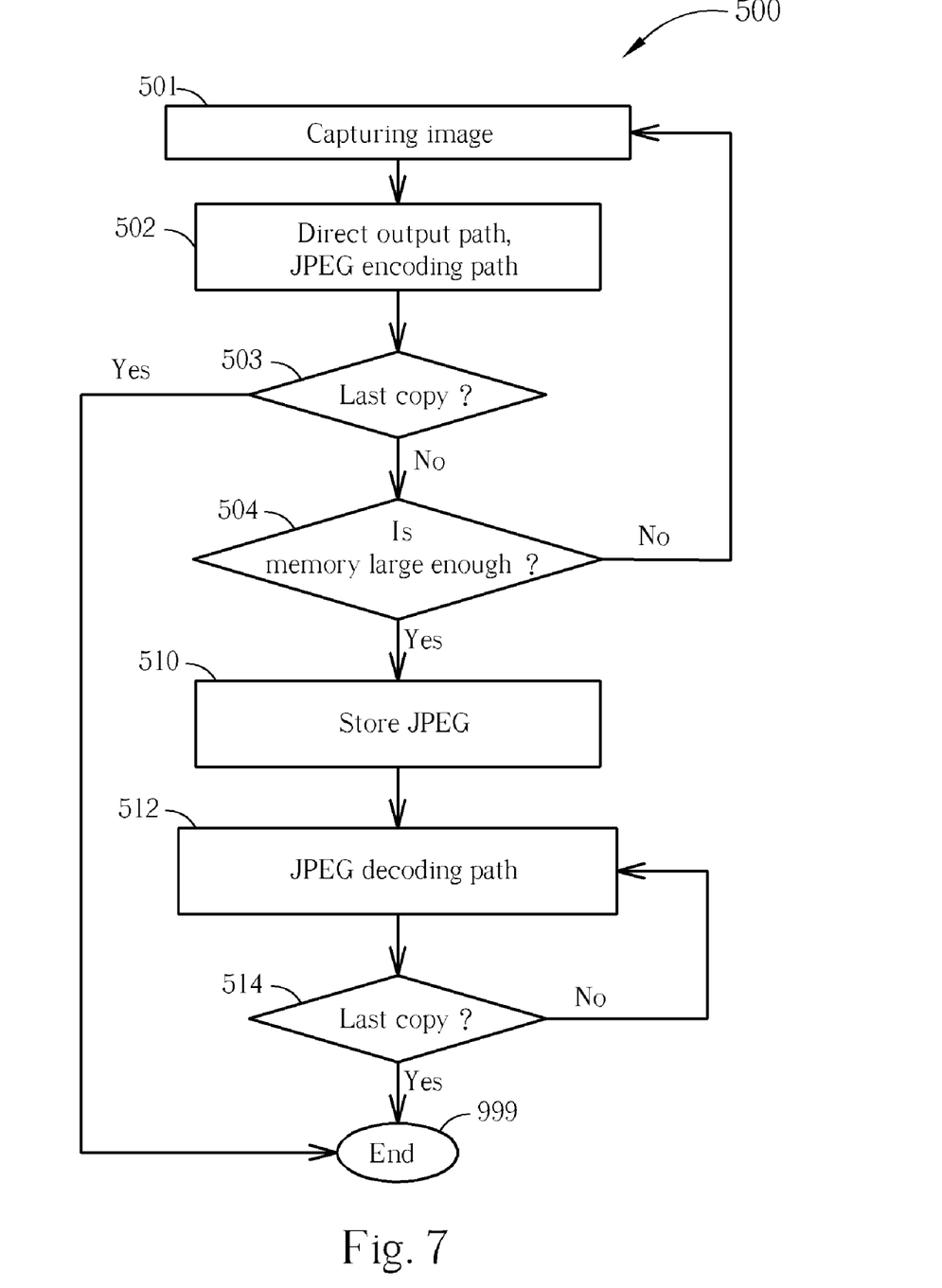
FIG. 7 is a flow chart of a fourth step of the method shown in FIG. 3.

Please refer to FIG. 7, which is a flow chart of the step 500 of the method 100. The step 500 comprises the following steps:

Step 501: Capture the original image and transform the original image into a gray-leveled image;

Step 502: Guide the gray-leveled image to flow into the direct output path and the JPEG encoding path;

(The method 100 determines that the copier 10 has to transform the original image into a plurality of copies all in the JBIG-formatted data. After controlling the image capturing module 12 to capture the original image, which will be transformed into a gray-leveled image and stored into the input register 13, the copier 10 then controls the gray-leveled image stored in the input register 13 to flow through the image processing module 14, the error diffusion module 16 to be transformed into a half-toned image, and the render & control module 18 to be transformed into a printable image to the image output device 20 to print one copy corresponding to the original image, and to the image compressor 22 to form a JPEG-formatted data.)

Step 503: Is the copy just output from the image output device 20 the last copy? If yes, go to step 999, else go to step 504;

Step 504: Is the remaining data storage capacity of the memory 24 large enough to store the JPEG-formatted data? If yes, go to step 510, else go to step 501;

Step 510: Store the JPEG-formatted data into the memory 24;

(The method 100 determines that the remaining data storage capacity of the memory 24 is large enough to store the JPEG-formatted data, and the processor 30 stores the JPEG-formatted data into the memory 24.)

Step 512: Guide the JPEG-formatted data stored in the memory 24 into the JPEG decoding path; and Step 514: Is the quantity of the copies output from the image output device 20 equal to that of the copies of the control data? If yes, go to step 999, else go to step 512.

(The processor 30 does not stop guiding the JPEG-formatted data stored in the memory 24 into the JPEG decoding path until the quantity of the copies output from the image output device 20 is equal to the quantity of copies of the control data.)

Figure 8:
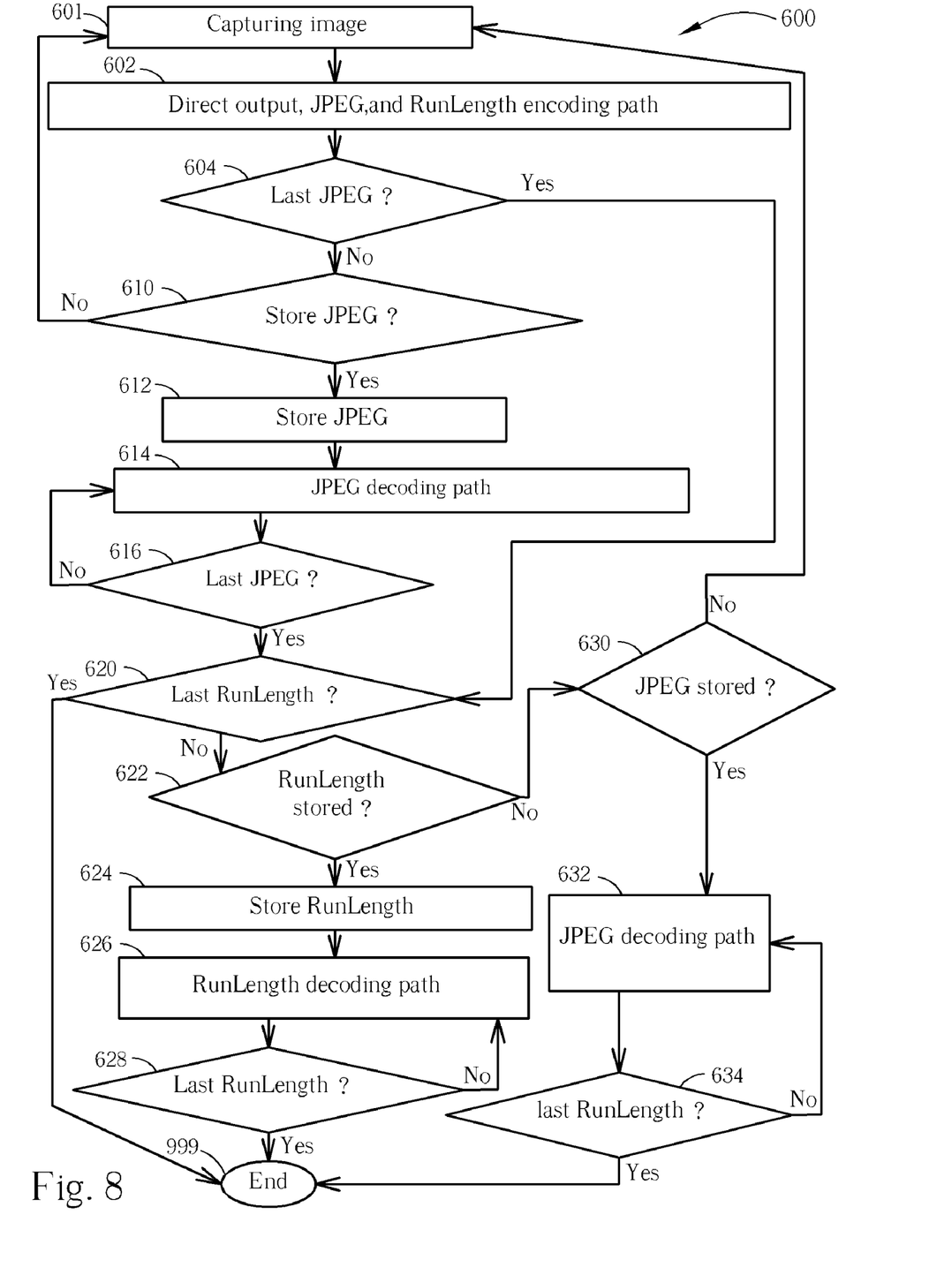
FIG. 8 is a flow chart of a fifth step of the method shown in FIG. 3.

Please refer to FIG. 8, which is a flow chart of the step 600 of the method 100. The step 600 comprises the following steps:

Step 601: Capture the original image and transform the original image into a gray-leveled image;

Step 602: Guide the gray-leveled image to flow into the direct output path, the RunLength encoding path, and the JPEG encoding path;

(The method 100 determines that the copier 10 has to transform the original image into a plurality of copies all either in the JPEG-formatted data or in the RunLength-formatted data. After controlling the image capturing module 12 to capture the original image, which will be transformed into a gray-leveled image and stored into the input register 13, the copier 10 then controls the gray-leveled image stored in the input register 13 to flow through the image processing module 14, the error diffusion module 16 to be transformed into a half-toned image, and the render & control module 18 to be transformed into a printable image to the image output device 20 to print one copy corresponding to the original image, and to the image compressor 22 to form a JPEG-formatted data and a RunLength-formatted data.)

Step 604: Is the copy just output from the image output device 20 the last copy in the JPEG-formatted data? If yes, go to step 620, else go to step 610;

Step 610: Is the remaining data storage capacity of the memory 24 large enough to store the JPEG-formatted data? If yes, go to step 612, else go to step 601;

Step 612: Store the JPEG-formatted data into the memory 24;

(The method 100 determines that the remaining data storage capacity of the memory 24 is large enough to store the JPEG-formatted data, and the processor 30 stores the JPEG-formatted data into the memory 24.)

Step 614: Guide the JPEG-formatted data stored in the memory 24 into the JPEG decoding path;

Step 616: Is the quantity of the copies in the JPEG-formatted data output from the image output device 20 equal to that of the copies in the JPEG-formatted data of the control data? If yes, go to step 620, else go to step 614;

(The processor 30 does not stop guiding the JPEG-formatted data stored in the memory 24 into the JPEG decoding path until the quantity of the copies in the JPEG-formatted data output from the image output device 20 is equal to the quantity of copies in the JPEG-formatted data of the control data.)

Step 620: Is the copy just output from the image output device 20 the last copy in the RunLength-formatted data? If yes, go to step 999, else go to step 622;

Step 622: Is the remaining data storage capacity of the memory 24 large enough to store the RunLength-formatted data? If yes, go to step 624, else go to step 630;

Step 624: Store the RunLength-formatted data into the memory 24;

(The method 100 determines that the remaining data storage capacity of the memory 24 is large enough to store the RunLength-formatted data, and the processor 30 stores the RunLength-formatted data into the memory 24.)

Step 626: Guide the RunLength-formatted data stored in the memory 24 into the RunLength decoding path;

Step 628: Is the quantity of the copies in the RunLength-formatted data output from the image output device 20 equal to that of the copies in the RunLength-formatted data of the control data? If yes, go to step 999, else go to step 626;

(The processor 30 does not stop guiding the RunLength-formatted data stored in the memory 24 into the RunLength decoding path until the quantity of the copies in the RunLength-formatted data output from the image output device 20 is equal to the quantity of copies in the RunLength-formatted data of the control data.)

Step 630: Is the memory 24 stored with the JPEG-formatted data? If yes, go to step 632, else go to step 601;

Step 632: Guide the JPEG-formatted data stored in the memory 24 into the JPEG decoding path; and (Although not large enough to store the RunLength-formatted data, the remaining data storage capacity of the memory 24 is still large enough to store the JPEG-formatted data, and the remaining copies in the RunLength-formatted data can be obtained through the flow of the JPEG-formatted data into the JPEG decoding path.)

Step 634: Is the quantity of the copies in the RunLength-formatted data equal to that of the copies in the RunLength-formatted data of the control data? If yes, go to step 999, else go to step 632.

In the step 600, only when the remaining data storage capacity of the memory 24 is not large enough to store the RunLength-formatted data, the method 100 will re-capture the original image, and print the copies of the original image. That is to say, the method 100 stores the JPEG- or/and the RunLength-formatted data into the memory 24 in advance if the remaining data storage capacity of the memory 24 is large enough to store the JPEG- or/and the RunLength-formatted data, the step to re-capture the original image by the image capturing module 12 hereby omitted, so as to speed the efficiency of the copier 10, for time for a copier to capture and process the original image is much longer than that to print the printable image.

In the step 600, the method 100 first prints the copies in the JPEG-formatted data and then the copies in the RunLength-formatted data after determining if the remaining data storage capacity of the memory 24 is large enough to store the copies in the JPEG-formatted data (step 610) or even large enough to store the RunLength-formatted data. That is to say, after determining that the remaining data storage capacity of the memory 24 is too small to store the JPEG-formatted data, the method 100 will keep on executing the steps from 601 to 610 until all of the copies in the JPEG-formatted data have been printed by the image output device 20, and then determines if the remaining data storage capacity of the memory 24 is large enough to store the RunLength-formatted data. Since the data storage capacity required to store the JPEG-formatted data is far larger than that required to store the RunLength-formatted data, and the probability for the memory 24 to successfully store the JPEG-formatted data and to guide the stored JPEG-formatted data into the JPEG decoding path is far smaller than that for the memory 24 to successfully store the RunLength-formatted data and to guide the stored RunLength-formatted data into the RunLength decoding path, in order to improve the efficiency of the copier 10, the method 100 can selectively determine if the remaining data storage capacity of the memory 24 is large enough to store the RunLength-formatted data first and print the copies in the RunLength-formatted data first, and then determine if the remaining data storage capacity of the memory 24 is still large enough to store the JPEG-formatted data and print the remaining copies in the JPEG-formatted data after all of the copies in the RunLength-formatted data have been printed.

Figure 9:
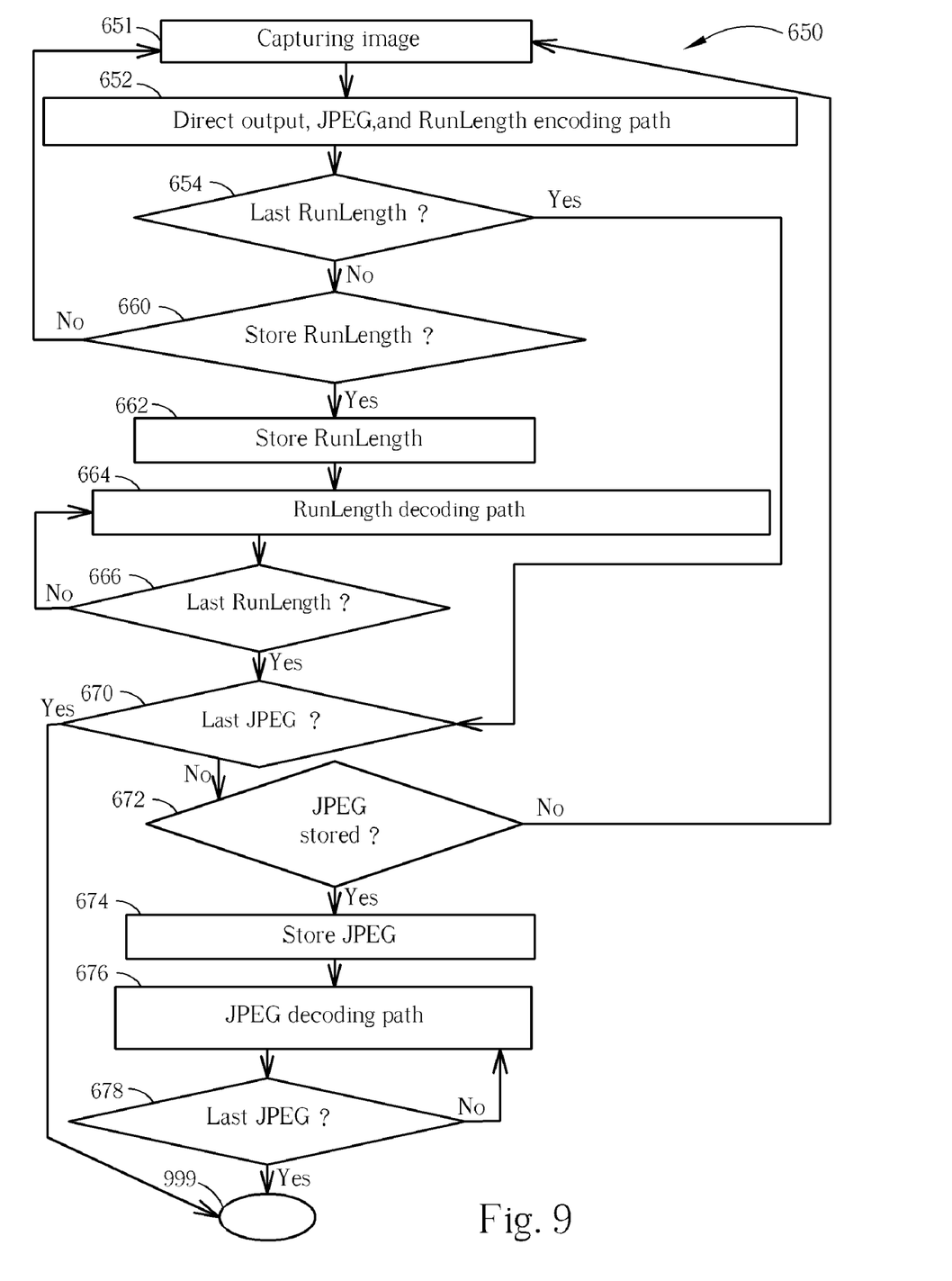
FIG. 9 is a flow chart of a sixth step of the method shown in FIG. 3.

Please refer to FIG. 9, which is a flow chart of a step 650 of the method 100. The step 650 is designed to replace the step 600. In the step 650, the method 100 determines if the remaining data storage capacity of the memory 24 is large enough to store the RunLength-formatted data and the JPEG-formatted data, and prints the copies in the RunLength- and the JPEG-formatted data sequentially. The step 650 comprises the following steps:

Step 651: Capture the original image and transform the original image into a gray-leveled image;

Step 652: Guide the gray-leveled image to flow into the direct output path, the JPEG encoding path, and the RunLength encoding path;

Step 654: Is the copy just output from the image output device 20 the last copy in the RunLength-formatted data? If yes, go to step 670, else go to step 660;

Step 660: Is the remaining data storage capacity of the memory 24 large enough to store the RunLength-formatted data? If yes, go to step 662, else go to step 651;

Step 662: Store the RunLength-formatted data into the memory 24;

Step 664: Guide the RunLength-formatted data stored in the memory 24 into the RunLength decoding path;

Step 666: Is the quantity of the copies in the RunLength-formatted data output from the image output device 20 equal to that of the copies in the RunLength-formatted data of the control data? If yes, go to step 670, else go to step 664;

Step 670: Is the copy just output from the image output device 20 the last copy in the JPEG-formatted data? If yes, go to step 999, else go to step 672;

Step 672: Is the remaining data storage capacity of the memory 24 still large enough to store the JPEG-formatted data? If yes, go to step 674, else go to step 651;

(As far as the memory 24 is concerned, if the remaining data storage capacity of the memory 24 is now too small to store the JPEG-formatted data, even though the memory 24 is stored with the RunLength-formatted data, the method 100 will go back to the step 651 to re-capture the original image because the RunLength-formatted data already stored in the memory 24 cannot applied to print the copies in the JPEG-formatted data.)

Step 674: Store the JPEG-formatted data into the memory 24;

Step 676: Guide the JPEG-formatted data stored in the memory 24 into the JPEG decoding path;

Step 678: Is the quantity of the copies in the JPEG-formatted data output from the image output device 20 equal to that of the copies in the JPEG-formatted data of the control data? If yes, go to step 999, else go to step 676.

Of course, as far as the step 600 is concerned, the method 100, after determining that the remaining data storage capacity of the memory 24 is too small to store the JPEG-formatted data, can determine if the remaining data storage capacity of the memory 24 is large enough to store the RunLength-formatted data immediately, and re-capture the original image and print the remaining copies in the JPEG-formatted data after printing all of the copies in the RunLength-formatted data.

The step 700, and the step 800 as well, is similar to the step 600 (or the step 650). The steps 700 and 800 are formed by replacing the JPEG (requiring big data storage capacity) and the RunLength (requiring small data storage capacity) in the step 600 by the JBIG, further description hereby omitted.

Figure 10:
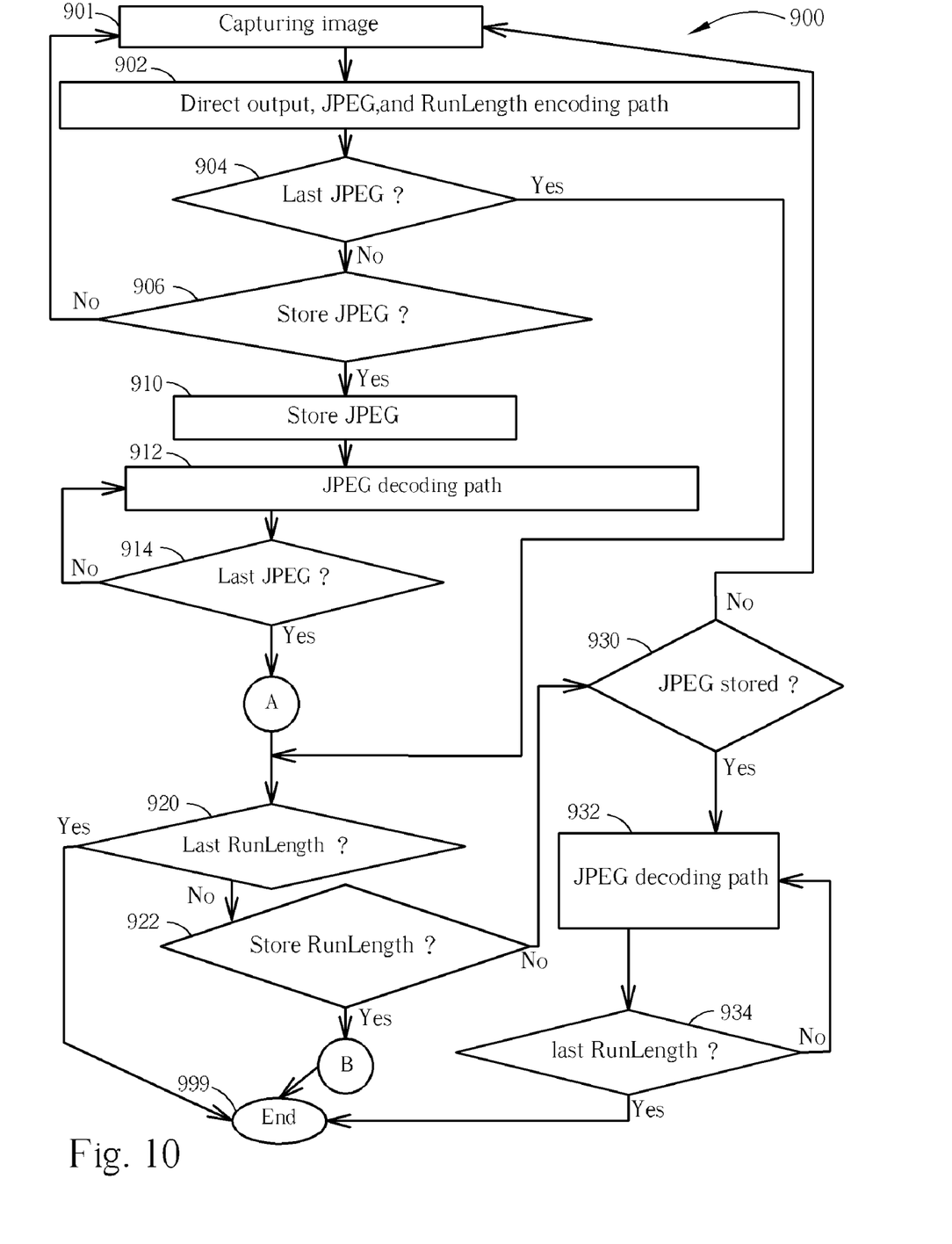
FIG. 10 to FIG. 12 are flow charts of a seven step of the method shown in FIG. 3.
Figure 11:
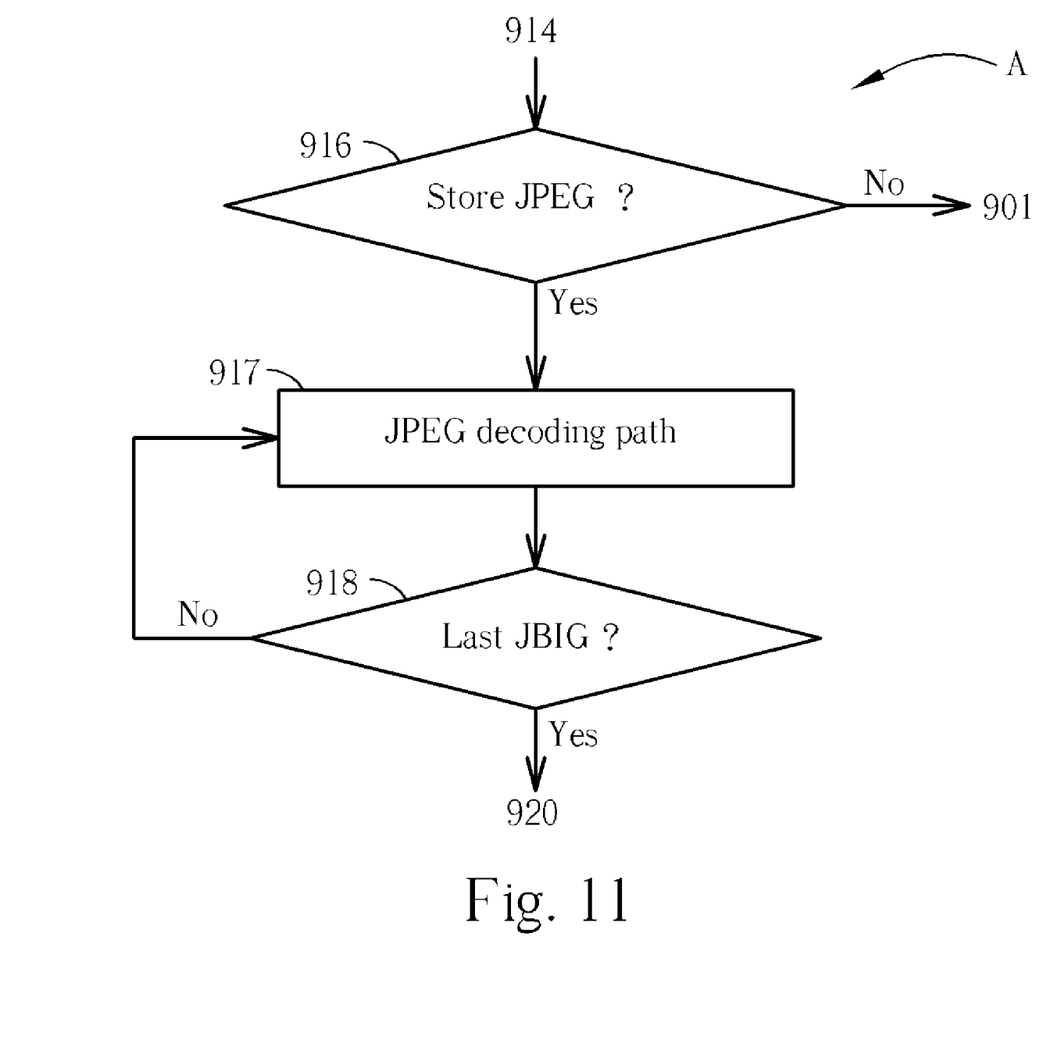
Figure 12:
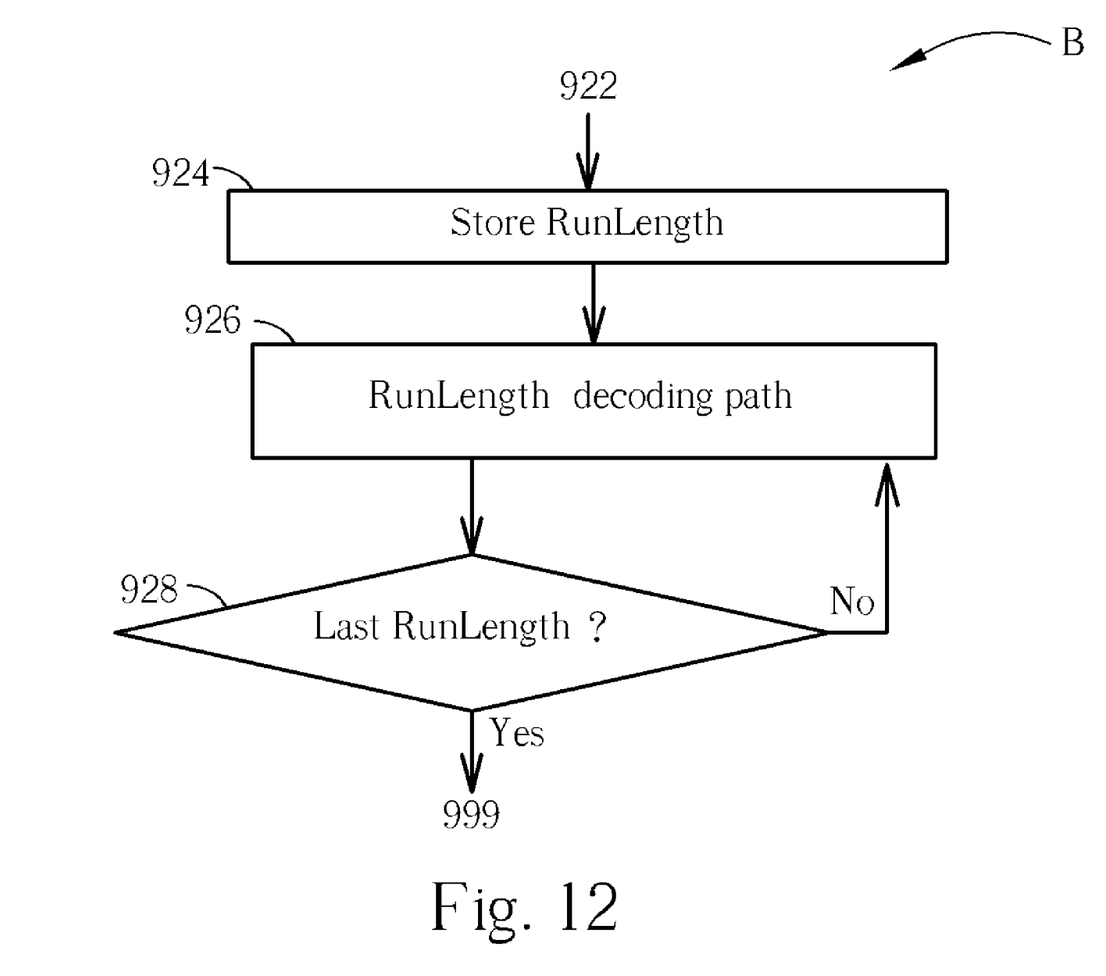

Please refer to FIG. 10 to FIG. 12, which are three flow charts of a step 900 of the method 100. In addition to obey the principles of the step 600—determining if the remaining data storage capacity of the memory 24 is large enough to store the JPEG-(the largest), the JBIG-, and the RunLength-formatted data (the smallest) sequentially, and storing the JPEG-, the JBIG-, and/or the RunLength-formatted data into the memory 24 according to the determination results, the step 900 can change to obey the principles of the step 650— determining if the remaining data storage capacity of the memory 24 is large enough to store the RunLength-, the JBIG-, and the JPEG-formatted data sequentially, and storing the RunLength-, the JBIG-, and/or the JPEG-formatted data into the memory 24 according to the determination results, so as to improve the efficiency of the copier 10. However, since the copies in the JBIG-formatted data can be obtained through the flow of the JPEG-formatted data stored in the memory 24 into the JPEG decoding path, as disclosed in the step 632 of the step 600, the step 900 shown in FIG. 10 can selectively control the image compressor 22 not to compress a half-toned image output from the error diffusion module 16 into a JBIG-formatted data. The step 900 comprises the following stpes:

Step 901: Capture the original image, and transform the original image into a gray-leveled image;

Step 902: Guide the gray-leveled image to the direct output path, the JPEG encoding path, and the RunLength encoding path;

Step 904: Is the copy just output from the image output device 20 the last copy in the JPEG-formatted data? If yes, go to step 920, else go to step 906;

Step 906: Is the remaining data storage capacity of the memory 24 large enough to store the JPEG-formatted data? If yes, go to step 908, else go to step 901;

Step 908: Store the JPEG-formatted data into the memory 24;

Step 910: Guide the RunLength-formatted data stored in the memory 24 to the JPEG encoding path;

Step 912: Is the quantity of the copies in the JPEG-formatted data output from the image output device 20 equal to that of the copies in the JPEG-formatted data of the control data? If yes, go to step 914, else go to step 910;

(The processor 30 does not stop guiding the JPEG-formatted data stored in the memory 24 into the JPEG decoding path until the quantity of the copies in the JPEG-formatted data output from the image output device 20 is equal to the quantity of copies in the JPEG-formatted data of the control data.)

Step 914: Is the copy just output from the image output device 20 the last copy in the JBIG-formatted data? If yes, go to step 920, else go to step 916;

Step 916: Is the memory 24 already stored with the JPEG-formatted data? If yes, go to step 917, else go to step 901;

Step 917: Guide the JPEG-formatted data stored in the memory 24 to the JPEG encoding path;

(Since the memory 24 is already stored with the JPEG-formatted data, the remaining copies in the JBIG-formatted data can be obtained through the flow of the JPEG-formatted data stored in the memory 24 into the JPEG decoding path.)

Step 918: Is the quantity of the copies in the JBIG-formatted data output from the image output device 20 equal to that of the copies in the JBIG-formatted data of the control data? If yes, go to step 920, else go to step 917;

Step 920: Is the copy just output from the image output device 20 the last copy in the RunLength-formatted data? If yes, go to step 999, else go to step 922;

Step 922: Is the remaining data storage capacity of the memory 24 large enough to store the RunLength-formatted data? If yes, go to step 924, else go to step 930;

Step 924: Store the RunLength-formatted data into the memory 24;

(The remaining data storage capacity of the memory 24 is large enough to store the RunLength-formatted data, and the processor 30 can store the RunLength-formatted data into the memory 24.)

Step 926: Guide the RunLength-formatted data stored in the memory 24 to the RunLength encoding path;

Step 928: Is the quantity of the copies in the RunLength-formatted data output from the image output device 20 equal to that of the copies in the RunLength-formatted data of the control data? If yes, go to step 999, else go to step 926;

(The processor 30 does not stop guiding the RunLength-formatted data stored in the memory 24 into the RunLength decoding path until the quantity of the copies in the RunLength-formatted data output from the image output device 20 is equal to the quantity of copies in the RunLength-formatted data of the control data.)

Step 930: Is the memory 24 already stored with the JPEG-formatted data? If yes, go to step 932, elsw go to step 901;

Step 932: Guide the JPEG-formatted data stored in the memory 24 to the JPEG decoding path; and (Although the remaining data storage capacity of the memory 24 is too small to store the RunLength-formatted data, the memory 24 is already stored with the JPEG-formatted data, and the remaining copies can be obtained through the flow the JPEG-formatted data stored in the memory 24 into the JPEG decoding path.)

Step 934: Is the quantity of the copies in the RunLength-formatted data output from the image output device 20 equal to that of the copies in the RunLength-formatted data of the control data? If yes, go to step 999, else go to step 932.

Of course, the step 900 shown in FIG. 10 can selectively control the image compressor 22 not to compress a printable image into a RunLength-formatted data, but to compress a half-toned image into a JBIG-formatted data, and the remaining copies in the RunLength-formatted data can be obtained through the flow of the JPEG- or JBIG-formatted data stored in the memory 24 into the JPEG or the JBIG decoding path respectively, which are similar to the step 900, further description hereby omitted. Moreover, the step 900 can further selectively determine if the remaining data storage capacity of the memory 24 is large enough to store the JBIG-formatted data and print the copies in the JBIG-formatted data first, and then determine if the remaining data storage capacity of the memory 24 is large enough to store the JPEG-formatted data (or the RunLength-formatted data) and print the copies in the JPEG-formatted (or the RunLength-formatted data) data after all of the copies in the JBIG-formatted data have been printed completely. The step first determining if the remaining data storage capacity of the memory 24 is large enough to store the JBIG-formatted data and then determining if the remaining data storage capacity of the memory 24 is large enough to store the JPEG-formatted data (from small to large) is similar to the step 650, and the step first determining if the remaining data storage capacity of the memory 24 is large enough to store the JBIG-formatted data and then determining if the remaining data storage capacity of the memory 24 is large enough to store the RunLength-formatted data (from large to small) is similar to the step 600, further details hereby omitted.

In contrast to the prior art, the present invention can provide a copier for first transforming an original image into a JPEG-, a JBIG-, and a RunLength-formatted data, then storing the JPEG-, the JBIG-, and the RunLength-formatted data into a memory, and finally guiding the JPEG-, the JBIG-, and the RunLength-formatted data into a JPEG, a JBIG, and a RunLength decoding paths respectively and printing copies in the JPEG-, the JBIG-, and the RunLength-formatted data with an image output device, an image processing, an error diffusion module, a render & control module, and an image compressor according to the remaining data storage capacity of the memory and a control data input to a control panel of the copier. The copier can capture the original image once and print all of the copies in any formatted data if the remaining data storage capacity of the memory is large enough to store the JPEG-, the JBIG-, or the RunLength-formatted data, so the copier has a good efficiency. Moreover, the copier is implemented by appending an image compressor and a data de-compressor to the prior art copier, and has a simple structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transforming an original image into a plurality of copies in at lease one format, the method comprising the steps of:
   (a) capturing the original image and transforming the original image into a gray-leveled image;
   (b) guiding the gray-leveled image into a direct output path to output a first copy of the plurality of copies, and guiding the gray-leveled image into a predetermined encoding path to compress the gray-leveled image into a predetermined-formatted data according to the format of the copies, so as to store the remaining copies of the plurality of copies; and
   (c) determining if a remaining data storage capacity of a memory is large enough to store the predetermined-formatted data, and storing the predetermined-formatted data into the memory and guiding the predetermined-formatted data stored in the memory into a predetermined decoding path to print the remaining copies of the plurality of copies if the remaining data storage capacity of the memory is large enough to store the predetermined-formatted data.

2. The method of claim 1, wherein the plurality of copies comprise a first format and a second format, the predetermined encoding path comprises a first encoding path and a second encoding path, the predetermined-formatted data comprises a first-formatted data and a second-formatted data, the predetermined decoding path comprises a first decoding path and a second decoding path, and the step (c) is first to determine if the remaining data storage capacity of the memory is large enough to store the first-formatted data, if the remaining data storage capacity of the memory is large enough to store the first-formatted data, the first-formatted data is stored into the memory and the first-formatted data stored in the memory is guided into the first decoding path to print the remaining copies in the first-formatted data, and then to determine if the remaining data storage capacity of the memory is still large enough to store the second-formatted data, if the remaining data storage capacity of the memory is still large enough to store the second-formatted data, the second-formatted data is stored into the memory and the second-formatted data stored in the memory is guided into the second decoding path to print the remaining copies in the second-formatted data.

3. The method of claim 2, wherein the first-formatted data is smaller in size than the second-formatted data.

4. The method of claim 2, wherein the first-formatted data is larger in size than the second-formatted data.

5. The method of claim 4, wherein in the step (c), if the remaining data storage capacity of the memory is too small to store the second-formatted data but the memory is already stored with the first-formatted data, the first-formatted data stored in the memory is guided into the first decoding path to print the remaining copies in the second-formatted data.

6. The method of claim 1, wherein the gray-leveled image is, when guided into the direct output path, transformed into a half-toned image and a printable image sequentially, and output from an image output device.

7. The method of claim 1, wherein the predetermined-formatted data is a JPEG-formatted data.

8. The method of claim 7, wherein the predetermined-formatted data stored in the memory is, when guided into the predetermined decoding path, first transformed into a gray-leveled image, then into a half-toned image, and finally into a printable image sequentially, and output from an image output device.

9. The method of claim 1, wherein the predetermined-formatted data is a JBIG-formatted data.

10. The method of claim 9, wherein the predetermined-formatted data stored in the memory is, when guided into the predetermined decoding path, transformed into a half-toned image and a printable image sequentially, and output from an image output device.

11. The method of claim 1, wherein the predetermined-formatted data is a RunLength-formatted data.

12. The method of claim 11, wherein the predetermined-formatted data stored in the memory is, when guided into the predetermined decoding path, transformed into a printable image, and output from an image output device.

* * * * *